US007771116B2

(12) United States Patent
Bowen

(10) Patent No.: US 7,771,116 B2
(45) Date of Patent: Aug. 10, 2010

(54) CERAMIC THERMOCOUPLE

(75) Inventor: Paul Lincoln Bowen, Farnborough (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 348 days.

(21) Appl. No.: 11/489,713

(22) Filed: Jul. 20, 2006

(65) Prior Publication Data
US 2007/0029303 A1      Feb. 8, 2007

(30) Foreign Application Priority Data
Jul. 21, 2005     (GB)     ................... 0514994.3

(51) Int. Cl.
*G01K 7/00*       (2006.01)
(52) U.S. Cl. .................................. 374/179
(58) Field of Classification Search ................. 219/260, 219/261, 262, 263, 264, 265, 266, 267, 268, 219/269, 270; 374/179, 180, 181, 182, 184, 374/185
See application file for complete search history.

(56) References Cited

U.S. PATENT DOCUMENTS

| 3,305,405 A | | 2/1967 | Jamieson |
| 4,450,314 A | * | 5/1984 | Huther .................. 136/230 |
| 4,721,533 A | | 1/1988 | Phillippi et al. |
| 4,778,537 A | * | 10/1988 | Thom et al. .................. 136/201 |
| 5,221,916 A | * | 6/1993 | McQueen .................. 338/24 |
| 5,336,851 A | * | 8/1994 | Sawada et al. .......... 174/110 A |
| 5,456,761 A | | 10/1995 | Auger et al. |
| 5,520,461 A | * | 5/1996 | Curry et al. .................. 374/179 |
| 5,986,261 A | | 11/1999 | Lewis et al. |
| 6,012,565 A | * | 1/2000 | Mazur .................. 194/207 |
| 6,190,038 B1 | * | 2/2001 | Kita et al. .................. 374/140 |
| 6,280,083 B2 | * | 8/2001 | Kita et al. .................. 374/140 |
| 6,300,607 B1 | * | 10/2001 | Steinhauser et al. .......... 219/544 |
| 6,337,470 B1 | * | 1/2002 | Von Arx et al. ............. 219/544 |
| 2008/0175303 A1 | * | 7/2008 | Robbins .................. 374/179 |

FOREIGN PATENT DOCUMENTS

| GB | 2 288 908 | | 11/1995 |
| GB | 2 352 816 | | 2/2001 |
| JP | 63-169081 | | 7/1988 |
| JP | 7 181085 | * | 7/1995 |

* cited by examiner

*Primary Examiner*—Daniel Robinson
(74) *Attorney, Agent, or Firm*—Nixon & Vanderhye P.C.

(57) ABSTRACT

A ceramic thermocouple (10) in which the hot junction is defined by the junction between a first element (3) of molybdenum disilicide and a second element (2) of silicon carbide. The molybdenum disilicide element is formed by a layer of molybdenum disilicide on a molybdenum support.

13 Claims, 2 Drawing Sheets

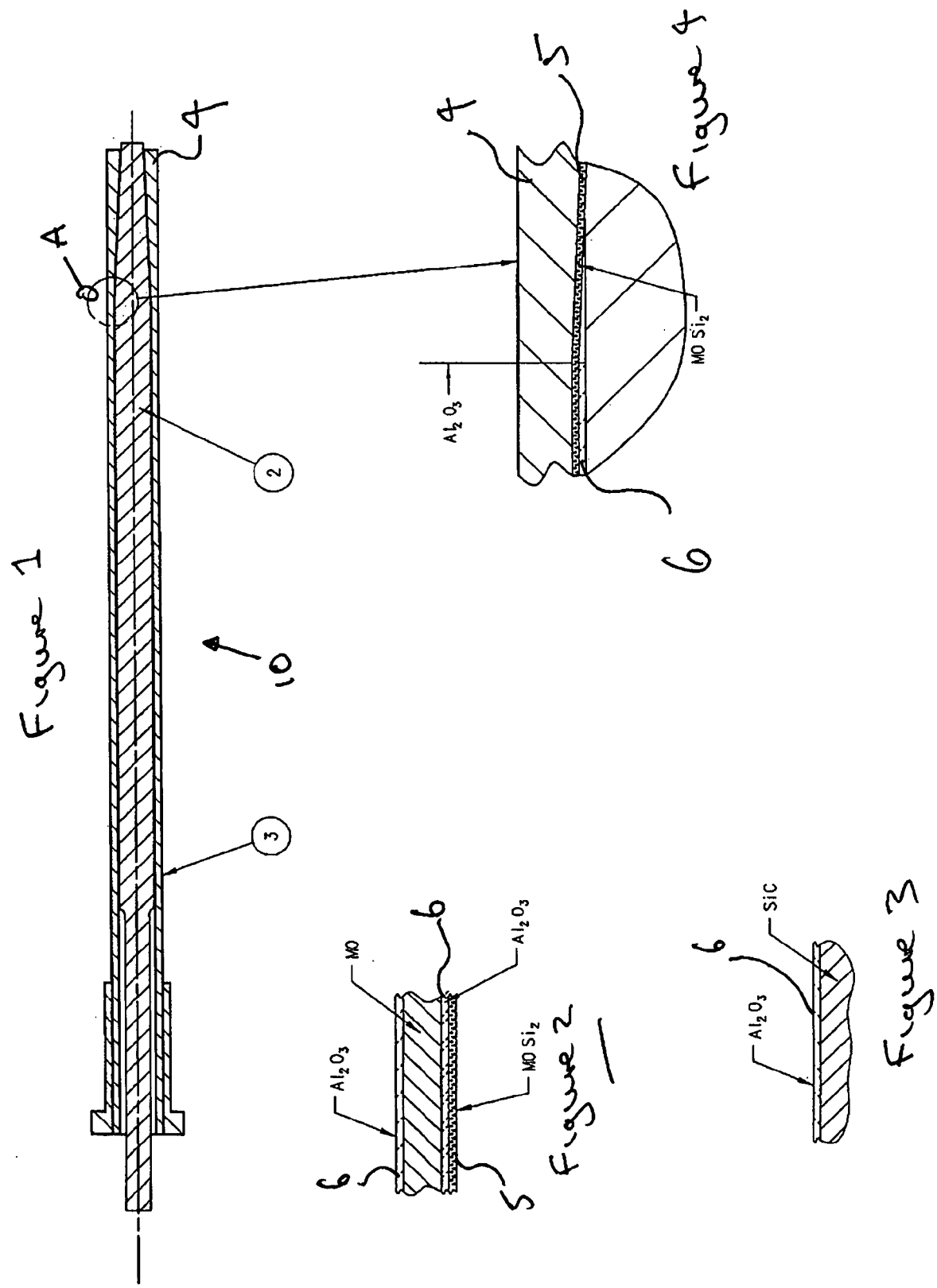

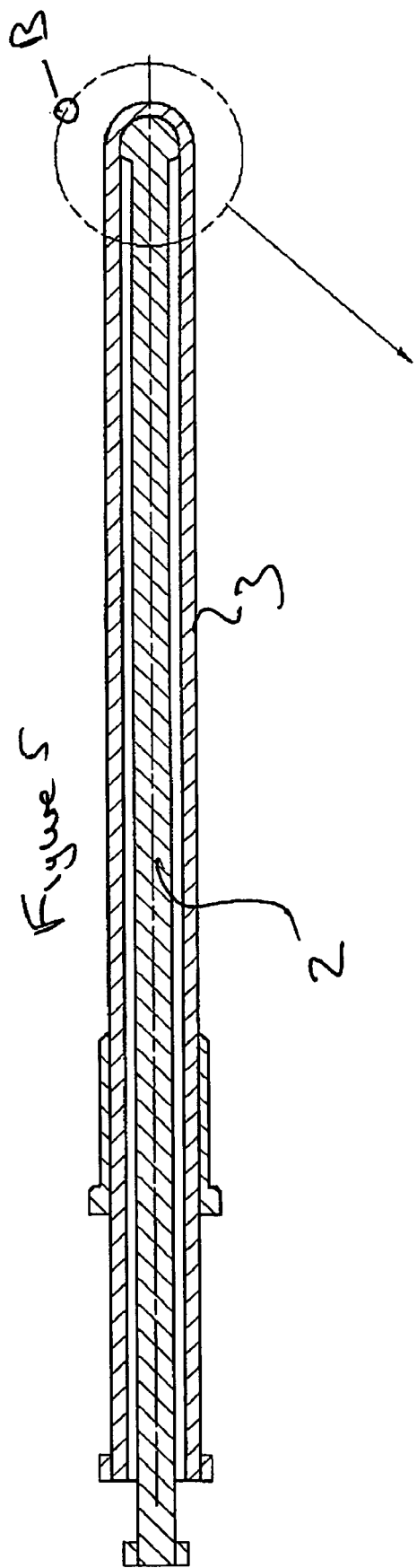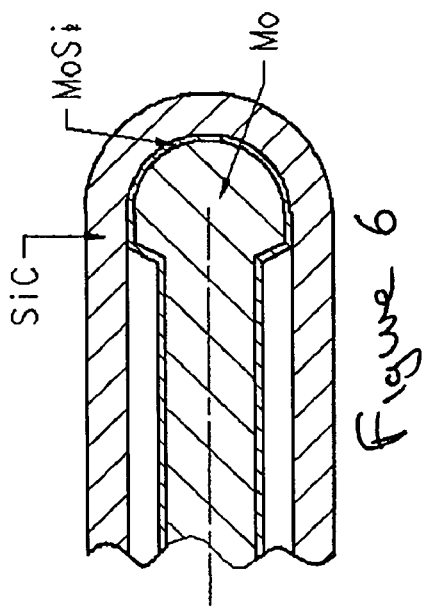

CERAMIC THERMOCOUPLE

The present invention relates to a thermocouple assembly and more particularly to a thermocouple formed by two ceramic elements joined at a junction.

It is known to produce thermocouples which measure temperature by measuring the electromotive force generated at the junction of two semi-conducting ceramics. GB 2, 288, 908 (Rowan Technologies Limited) discloses a ceramic thermocouple comprising two ceramics elements. The first ceramic element is a silicon carbide tube closed at one end, and the second ceramic element is a molybdenum disilicide rod placed inside the tube. The molybdenum disilicide rod is pressed by a spring arrangement against the closed end of the silicon carbide tube to form a thermocouple junction. The remainder of the molybdenum disilicide rod is separated from the silicon carbide tube by aluminium oxide washers ranged at intervals along the rod.

A problem of known ceramic thermocouples including that disclosed in GB 2, 288, 908 is their lack of mechanical integrity. They are not sufficiently rugged to withstand difficult environments such as a gas turbine.

By way of illustration of the invention, preferred embodiments of the invention will now be described with reference to the attached figures in which:

FIG. 1 is a cross-section through a thermocouple embodying the invention;

FIG. 2 is a magnified cross-section through item 2 of FIG. 1;

FIG. 3 is a magnified section through item 3 of FIG. 1;

FIG. 4 is a magnified view of the circled portion A of FIG. 1;

FIG. 5 is a cross-section through an alternative thermocouple embodying the invention; and FIG. 6 is a magnified view of the circled portion B of FIG. 5.

Referring to FIG. 1, a thermocouple assembly 10 comprises two elements 2, 3 of semi-conducting ceramic material. The first element 2 is a silicon carbide rod. The second element 3 is a molybdenum tube 4 having a coating 5 on its inner wall of molybdenum disilicide for contacting an end portion of the silicon carbide rod 2.

The silicon carbide rod has a tapered end portion and is coated with an insulator 6 such as aluminium oxide along its non-tapered portion. The rod has a diameter of about 4.5 mm.

The molybdenum tube has an internal tapered portion at one end. The shape and dimensions of the internal bore of the tube (including the taper of the molybdenum tube) match the external shape and dimension (including the taper) of the silicon carbide tube so that when the rod is pushed into the tube the rod is in contact with the tube along its length. The molybdenum tube has an external diameter of about 6.5 mm and an internal diameter of about 4.5 mm.

The molybdenum tube is coated with an insulator such as aluminium oxide on its internal and external surfaces. The internal bore of the tube has an additional coating of molybdenum disilicide on top of the aluminium oxide to form an element of semi-conducting ceramic.

As illustrated in FIG. 4, the molybdenum disilicide coating 5 on the tube is in contact with the silicon carbide rod 2 only where the respective tapers of the rod and tube are in contact. The insulating aluminium oxide coating 6 on the non-tapered portion of the silicon carbide rod separates the remainder of the semi-conducting silicon carbide from the remainder of the molybdenum disilicide coating.

The junction at the respective tapered end portions between the different semi-conducting elements defined by the silicon carbide rod and molybdenum disilicide coating produce an electromotive force dependent on the temperature of the junction and thereby form a thermocouple.

An alternative embodiment of the invention is illustrated in FIG. 5. In this embodiment, element 2 is a Molybdenum rod having a molybdenum disilicide coating on the outer surface and element 3 is a silicon carbide tube closed at one end.

Referring to FIG. 5, the molybdenum rod has a substantially hemispherical portion at one end. The molybdenum rod has a diameter of about 4 mm along the portion of the rod that is not substantially hemispherical in shape. The silicon carbide tube has a uniform external diameter of about 9.5 mm along its length.

The shape and dimensions of the uncoated internal bore of the silicon carbide tube match the shape and dimensions of the substantially hemispherical portion of the molybdenum rod with the molybdenum disilicide coating so that, when the rod is held within the tube, the molybdenum disilicide coating of the rod is in contact with the tube only around the substantially hemispherical portion of the rod. This defines the ceramic thermocouple junction.

The rod may be held resiliently within the tube by an endcap (not illustrated) including a biased element similar to that disclosed in GB 2,288,908.

The shape of the molybdenum rod is such that the only contact between the semi-conducting molybdenum rod and the semi-conducting molybdenum disilicide coating on the silicon carbide tube occurs at the thermocouple junction. Therefore, no aluminium oxide coating is required to insulate the molybdenum disilicide rod coating from the silicon carbide tube over the length. The removal of the aluminium oxide layer reduces the ceramic thermocouple manufacture costs.

The invention claimed is:

1. A thermocouple assembly comprising two different ceramics in contact with each other at a thermocouple junction, wherein the assembly comprises:
   a coating of a first ceramic on a metal support; and
   a surface of a second ceramic different from the first ceramic, and in contact with the first ceramic to define the thermocouple junction.

2. A thermocouple assembly according to claim 1 wherein the assembly comprises a coating of the first ceramic on the inner surface on a metal tube, and a rod having a surface of the second ceramic, the rod being inside the tube with at least part of said rod surface being in contact with said tube coating to define the thermocouple junction.

3. A thermocouple assembly according to claim 1 wherein the assembly comprises a coating of said first ceramic on a metal rod, and a tube having an inner surface of said second ceramic, the rod being inside the tube with at least part of said rod surface being in contact with said tube inner surface.

4. A thermocouple assembly according to claim 2 wherein the tube is a metal tube coated with an insulating material and the coating of the first ceramic is on top of the insulating coating.

5. A thermocouple assembly according to claim 2 wherein the rod is a rod of the second ceramic.

6. A thermocouple assembly according to claim 3 wherein the tube is a tube of the second ceramic.

7. A thermocouple assembly according to claim 1 wherein the two ceramics are molybdenum disilicide and silicon carbide.

8. A thermocouple assembly according to claim 6 wherein the metal is molybdenum.

9. A thermocouple assembly according to claim 2 wherein portions of the tube and rod have corresponding and matching tapers so that the respective tapered portions of the tube and rod are in intimate contact and define the thermocouple junction.

10. A thermocouple assembly according to claim 2 comprising a molybdenum tube with an internal tapered portion and having a first coating of aluminium oxide on its inner and outer surfaces and a second coating of molybdenum disilicide on its inner surface, and a rod of silicon carbide inside the tube and having a tapered portion matching the tapered portion of the tube so as to form contact therewith, the silicon carbide tube also having a coating of aluminium oxide on its non-tapered portion so as to electrically separate the non-tapered portions of the rod and tube.

11. A thermocouple assembly according to claim 2 wherein the rod has a distal end portion with a curved surface and the tube has a distal closed end, the closed end having a curved surface matching the rod end portion surface.

12. A thermocouple assembly comprising:
   a molybdenum tube with an internal tapered portion and an internal non-tapered portion, said tapered portion having a first coating of aluminium oxide on its inner and outer surfaces and a second coating of molybdenum disilicide on its inner surface; and
   a rod of silicon carbide inside the tube and having a tapered portion matching the tapered portion of the tube so as to form a contact therewith, the silicon carbide rod also having a coating of aluminium oxide on a non-tapered portion so as to electrically separate the non-tapered portions of the rod and tube.

13. A thermocouple assembly comprising two different ceramics in contact with each other on a thermocouple junction, wherein the assembly comprises:
   a first element having a coating of molybdenum disilicide on a molybdenum support; and
   a second element having a surface of silicon carbide in contact with the first element to define the thermocouple junction.

* * * * *